(12) United States Patent
Ott

(10) Patent No.: US 6,823,450 B2
(45) Date of Patent: Nov. 23, 2004

(54) MECHANISM FOR ELIMINATING NEED FOR FLASH MEMORY IN SOFTWARE RAID

(75) Inventor: William Brooks Ott, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 09/853,310

(22) Filed: May 11, 2001

(65) Prior Publication Data
US 2002/0178351 A1 Nov. 28, 2002

(51) Int. Cl.<sup>7</sup> .............................................. G06F 9/445
(52) U.S. Cl. .............................. 713/1; 713/2; 710/13; 709/222; 711/114; 711/173
(58) Field of Search .......................... 713/1, 2; 710/13, 710/8; 709/222; 711/100, 114, 170, 173

(56) References Cited

U.S. PATENT DOCUMENTS

| 5,301,297 A |   | 4/1994  | Menon et al. |       |
|-------------|---|---------|--------------|-------|
| 5,758,118 A |   | 5/1998  | Choy et al.  |       |
| 5,829,053 A |   | 10/1998 | Smith et al. |       |
| 5,905,888 A | * | 5/1999  | Jones et al. ...................... 713/2 |
| 6,003,097 A | * | 12/1999 | Richman et al. ................ 710/8 |
| 6,018,778 A |   | 1/2000  | Stolowitz    |       |
| 6,098,119 A |   | 8/2000  | Surugucchi et al. |  |
| 6,138,176 A |   | 10/2000 | McDonald et al. |   |
| 6,145,028 A |   | 11/2000 | Shank et al. |       |
| 6,529,989 B1 | * | 3/2003 | Bashford et al. ........... 710/306 |
| 6,567,911 B1 | * | 5/2003 | Mahmoud ....................... 713/2 |
| 6,651,165 B1 | * | 11/2003 | Johnson ......................... 713/2 |

* cited by examiner

*Primary Examiner*—Rehana Perveen
(74) *Attorney, Agent, or Firm*—Sawyer Law Group

(57) ABSTRACT

A method and mechanism for booting an operating system in a Redundant Arrays of Independent Disks (RAID) is disclosed. The method includes: searching for a copy of a RAID driver on at least one boot partition of a disk in the disk array, wherein copies of the RAID driver are stored in boot partitions of at least two of the disks in the disk array; and loading the RAID driver, if the RAID driver is found. In the preferred embodiment, the boot partitions of the disks are searched until a working copy of the RAID driver is found. The RAID driver is loaded and the RAID implemented. The operating system may then be booted. In this manner, the need for a Flash memory device for storing the RAID driver is eliminated. The method and mechanism can be implemented in existing systems not designed to support software RAID.

16 Claims, 4 Drawing Sheets

MECHANISM FOR ELIMINATING NEED FOR FLASH MEMORY IN SOFTWARE RAID

FIELD OF THE INVENTION

The present invention relates to computer disks, and more particularly to disk arays.

BACKGROUND OF THE INVENTION

Redundant Arrays of Independent Disks (RAID) are well known in the art. There are two types of RAID in the industry, hardware RAID and software RAID. The trend in the industry is toward software RAID due to the cost savings. FIG. 1 illustrates a conventional RAID. The RAID 102 is comprised of a logical disk array 104.1–104.N. In RAID, the data on the disk array 104.1–104.N, including the operating system (OS), is coded using a RAID algorithm. Only the RAID driver can read and decipher this data. Thus, in order to boot the OS, the RAID driver must be loaded first. Typically, the RAID driver 108 is stored on a dedicated Flash memory device 106 on the RAID controller 105 in the case of hardware RAID, or on the system board 105 in the case of software RAID. Upon booting, the controller processor (hardware RAID) or system processor (software RAID) fetches the RAID driver 108 from the Flash memory device 106, implements the RAID, and then boots the OS. However, the Flash memory device 106 adds costs to the implementation of the software RAID 102. In addition, if the Flash memory device 106 fails, then the RAID cannot be implement and the OS cannot be booted. The entire disk array fails.

Accordingly, there exists a need for an improved method and mechanism for booting an operating system in a RAID. The method and mechanism should eliminate the need for a Flash memory device. This should permit software RAID support for systems that were not specifically designed to support it. The present invention addresses such a need.

SUMMARY OF THE INVENTION

A method and mechanism for booting an operating system in a Redundant Arrays of Independent Disks (RAID) is disclosed. The method includes: searching for a copy of a RAID driver on at least one boot partition of a disk in the disk array, wherein copies of the RAID driver are stored in boot partitions of at least two of the disks in the disk array; and loading the RAID driver, if the RAID driver is found. In the preferred embodiment, the boot partitions of the disks are searched until a working copy of the RAID driver is found. The RAID driver is loaded and the RAID implemented. The operating system may then be booted. In this manner, the need for a Flash memory device for storing the RAID driver is eliminated. The method and mechanism can be implemented in existing systems not designed to support software RAID.

DETAILED DESCRIPTION

The present invention provides an improved method and mechanism for booting an operating system in a Redundant Arrays of Independent Disks (RAID). The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 4 in conjunction with the discussion below.

Figure 1:
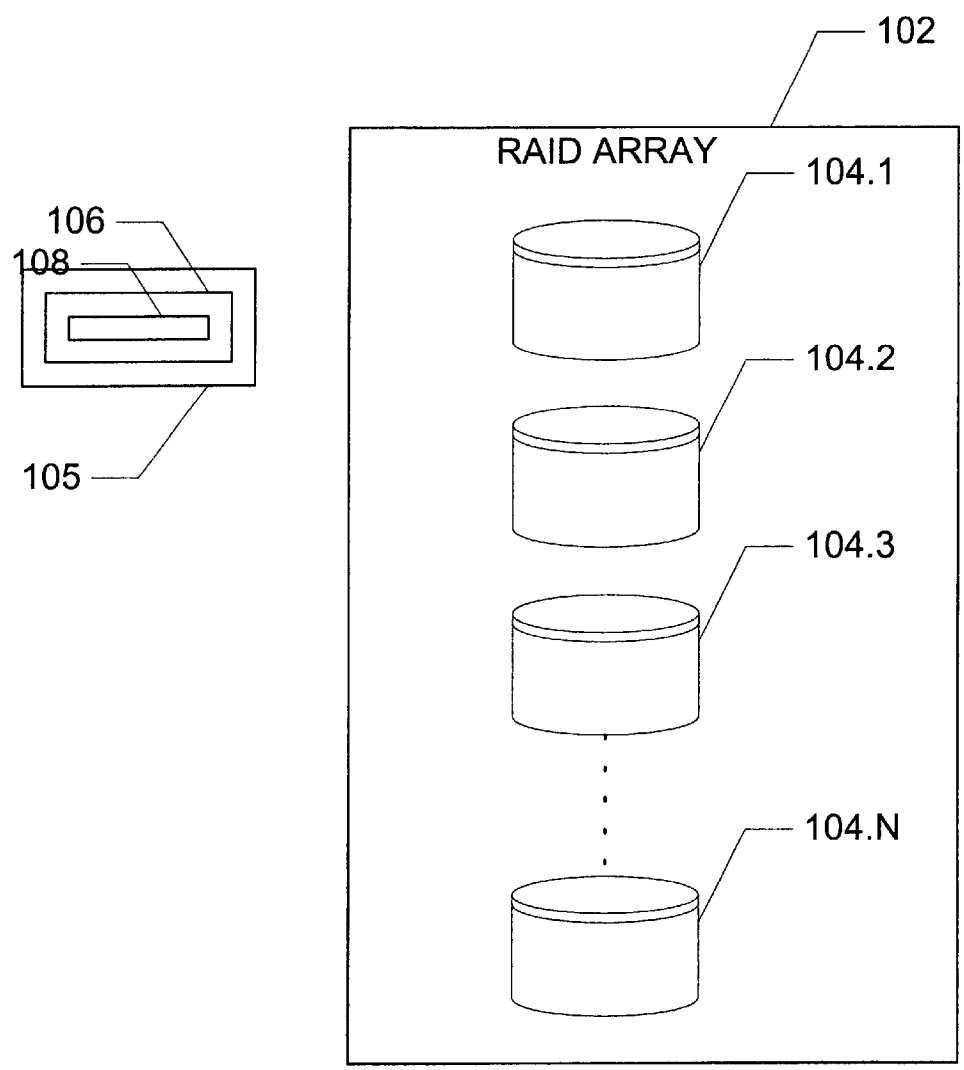
FIG. 1 illustrates a conventional Redundant Arrays of Independent Disks (RAID).
Figure 2:
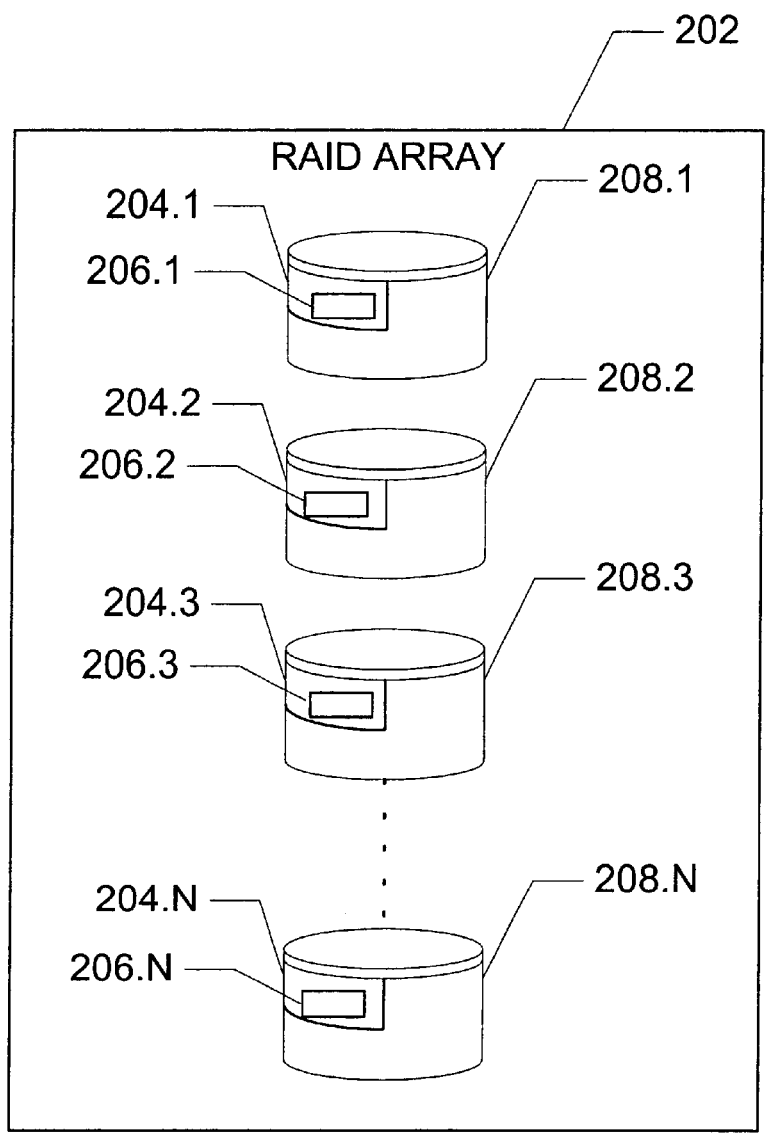
FIG. 2 illustrates a preferred embodiment of a mechanism for booting an operating system in a RAID in accordance with the present invention.

FIG. 2 illustrates a preferred embodiment of a mechanism for booting an operating system in a RAID in accordance with the present invention. The RAID 202 comprises a logical disk array 208.1–208.N. In the preferred embodiment, a boot partition 204.1–204.N is implemented on each disk 208.1–208.N. In each of these boot partitions, 204.1–204.N, a copy of the RAID driver 206.1–206.N is stored.

Although the preferred embodiment is illustrated with a boot partition 204.1–204.N implemented in each disk 208.1–208.N in the array, one of ordinary skill in the art will understand that boot partitions may be implemented in less than all of the disks without departing from the spirit and scope of the present invention.

Figure 3:
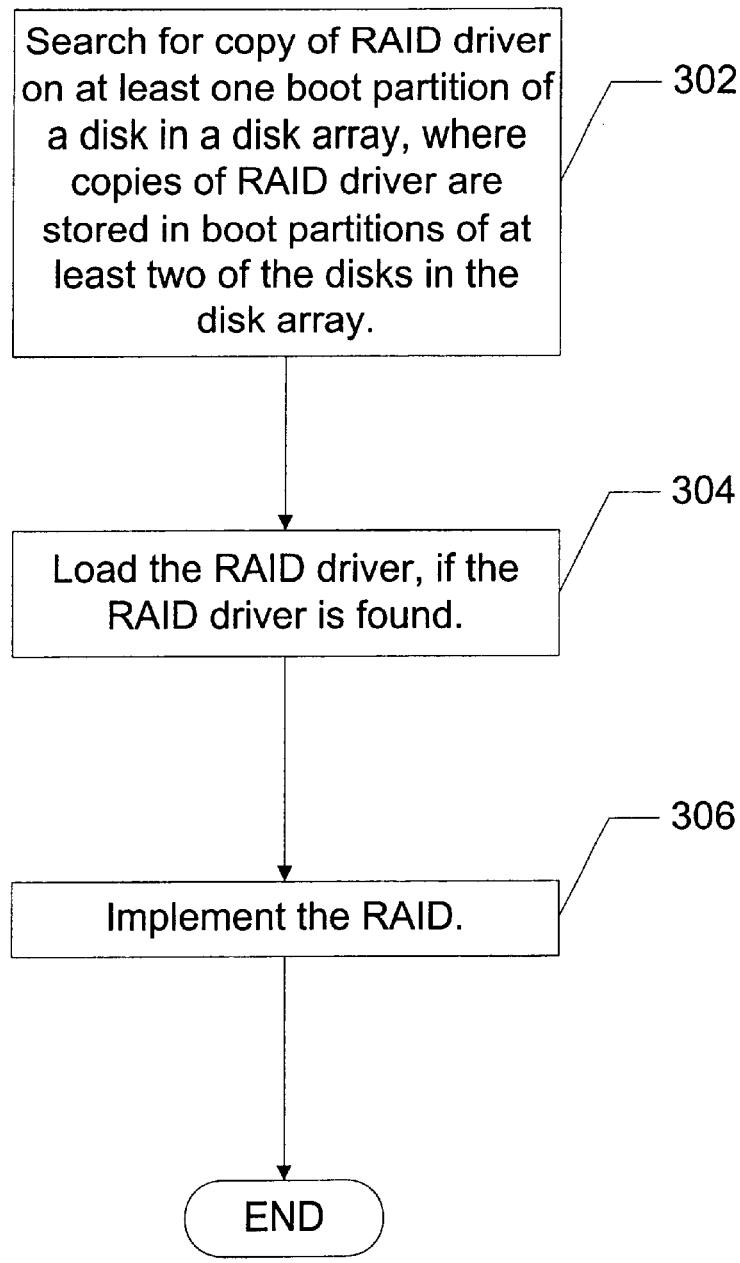
FIG. 3 is a flowchart illustrating a preferred embodiment of a method for booting an operating system in a RAID in accordance with the present invention.

FIG. 3 is a flowchart illustrating a preferred embodiment of a method for booting an operating system in a RAID in accordance with the present invention. First, the system boot code searches for a copy of the RAID driver 206.1–206.N on a boot partition 204.1–204.N of at least one disk 208.1–208.N in the disk array, via step 302, Copies of the RAID driver are stored in the boot partitions of at least two of the disks 208.1–208.N. In the preferred embodiment, a boot partition is implemented in each disk 208.1–208.N. A copy of the RAID driver 206.1–206.N is stored at the boot partitions 204.1–204.N. Once a working copy of the RAID driver 206.1–206.N is found, the system boot code loads the RAID driver 208.1–208.N, via step 304, and implements the RAID, via step 306. Once the RAID is implemented, the OS may be booted.

Figure 4:
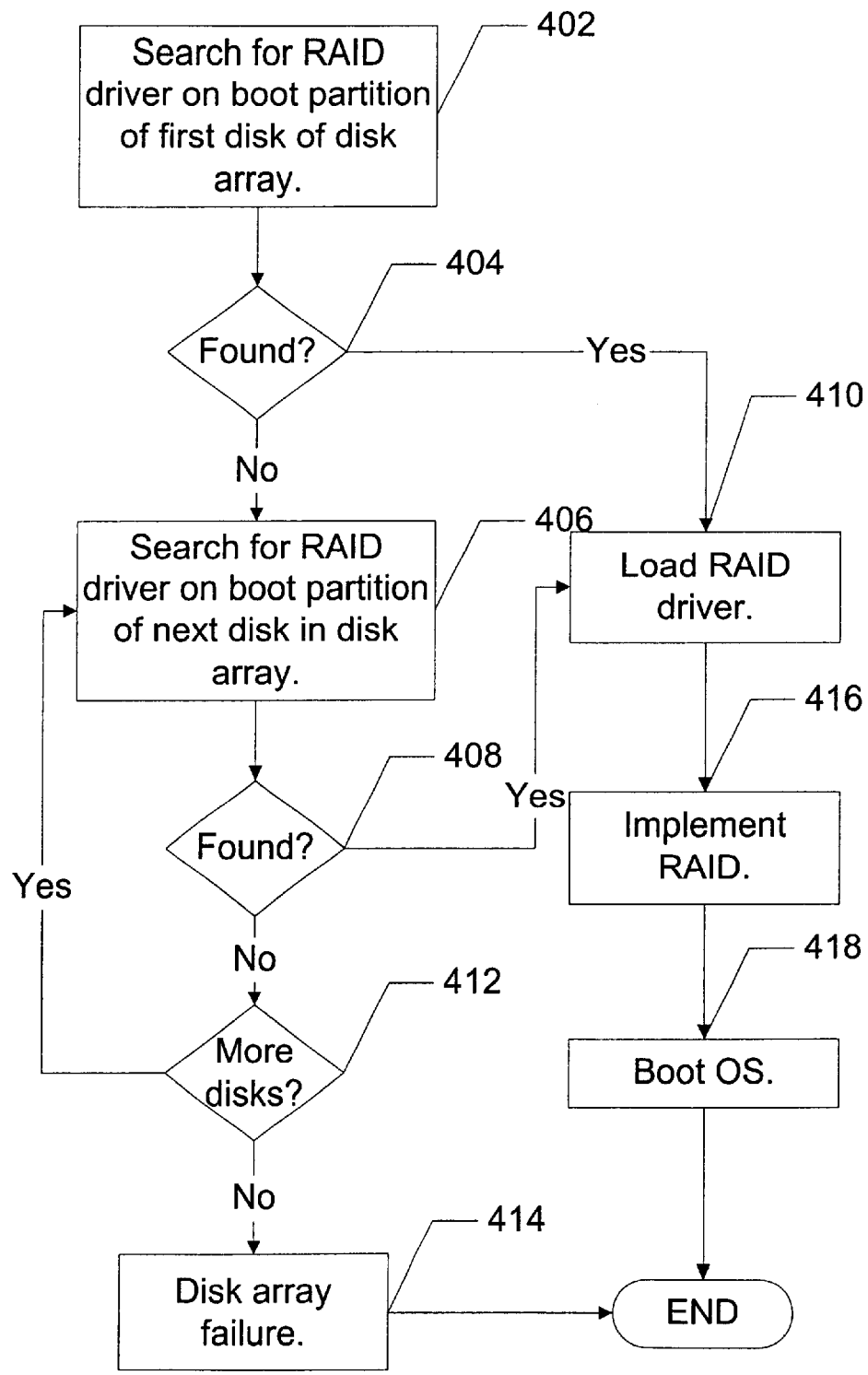
FIG. 4 is a flowchart illustrating in more detail the method for booting an operating system in a RAID in accordance with the present invention.

FIG. 4 is a flowchart illustrating in more detail the method for booting an operating system in a RAID in accordance with the present invention. First the system boot code searches for a copy of the RAID driver 206.1 on the boot partition 204.1 of the first disk 208.1 of the disk array, via step 402. If a working copy of the RAID driver 206.1 is found, via step 404, then it is loaded, via step 410, and the RAID implemented, via step 416. The OS can then be booted, via step 418. If a working copy of the RAID driver 206.1 is not found on the first disk 208.1, via step 404, (due to failure of the disk, corruption of the RAID driver software, or some other problem) then the system boot code searches the boot partition 204.2 on the next disk 208.2 for a working copy of the RAID driver 206.2, via step 406. If a working copy of the RAID driver 206.2 is found on disk 208.2, then it is loaded, via step 410, the RAID implemented, via step 416, and the OS booted, via step 418. If it is not found on disk 208.2, and there are more disks in the array, via step 412, then the system boot code searches the boot partition 204.3 of the next disk 208.3 of the disk array for a working copy of the RAID driver 206.3, via step 406. Steps 406 through 412 are repeated until either a working copy of the RAID driver is found or when it is found on none of the disks 208.1–208.N. If it is found on none of the disks 208.1–208.N, then there is a failure of the disk array, via step 414.

A method and mechanism for booting an operating system in a Redundant Arrays of Independent Disks (RAID) has been disclosed. In the preferred embodiment, a boot partition is implemented in at least two of the disks of a RAID array. Each of these boot partitions stores a copy of the RAID driver. The boot partitions of the disks are searched until a working copy of the RAID driver is found. The RAID driver is then loaded, and the RAID implemented. The operating system (OS) may then be booted. In this manner, the need for a Flash memory device for storing the RAID driver is eliminated, reducing the cost of the RAID. Without the need for the Flash memory device, the method and mechanism can be implemented in existing systems not specifically designed to support it, without the need to replace the system board or requiring an adapter. In addition, redundancy is provided for the boot partition.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for booting an operating system in redundant arrays of independent disks (RAID), the RAID including a disk array, comprising the steps of:
    (a) searching for a copy of a RAID driver on at least one boot partition of a disk in the disk array, wherein copies of the RAID driver are stored in boot partitions of at least two of the disks in the disk array; and
    (b) loading the RAID driver, if the RAID driver is found.

2. The method of claim 1, wherein the searching step (a) comprises:
    (a1) searching for the copy of the RAID driver on a first disk in the disk array, wherein copies of the RAID driver are stored in boot partitions of at least two of the disks in the disk array; and
    (a2) searching for the copy of the RAID driver on a next disk in the disk array, if the copy of the RAID driver is not found on the first disk.

3. The method of claim 1, further comprising:
    (c) determining that the disk array has failed, if the copy of the RAID driver is not found on any disk in the disk array.

4. The method of claim 1, further comprising:
    (c) implementing the RAID; and
    (d) booting the operating system.

5. A method for booting an operating system in RAID, the RAID including a disk array, comprising the steps of:
    (a) searching for a copy of the RAID driver on a first disk in the disk array, wherein copies of the RAID driver are stored in boot partitions of at least two of the disks in the disk array; and
    (b) searching for the copy of the RAID driver on a next disk in the disk array, if the copy of the RAID driver is not found on the first disk; and
    (c) loading the RAID driver, if the RAID driver is found.

6. The method of claim 5, further comprising:
    (d) determining that the disk array has failed, if the copy of the RAID driver is not found on any disk in the disk array.

7. The method of claim 5, further comprising:
    (d) implementing the RAID; and
    (e) booting the operating system.

8. A computer readable medium with program instructions for booting an operating system in RAID, the RAID including a disk array, comprising the instructions for:
    (a) searching for a copy of a RAID driver on at least one boot partition of a disk in the disk array, wherein copies of the RAID driver are stored in boot partitions of at least two of the disks in the disk array; and
    (b) loading the RAID driver, if the RAID driver is found.

9. The medium of claim 8, wherein the searching instruction (a) comprises instructions for:
    (a1) searching for the copy of the RAID driver on a first disk in the disk array, wherein copies of the RAID driver are stored in boot partitions of at least two of the disks in the disk array; and
    (a2) searching for the copy of the RAID driver on a next disk in the disk array, if the copy of the RAID driver is not found on the first disk.

10. The medium of claim 8, further comprising instructions for:
    (c) determining that the disk array has failed, if the copy of the RAID driver is not found on any disk in the disk array.

11. The medium of claim 8, further comprising instructions for:
    (c) implementing the RAID; and
    (d) booting the operating system.

12. A computer readable medium with program instructions for booting an operating system in RAID, the RAID including a disk array, comprising the instructions for:
    (a) searching for a copy of the RAID driver on a first disk in the disk array, wherein copies of the RAID driver are stored in boot partitions of at least two of the disks in the disk array; and
    (b) searching for the copy of the RAID driver on a next disk in the disk array, if the copy of the RAID driver is not found on the first disk; and
    (c) loading the RAID driver, if the RAID driver is found.

13. The medium of claim 12, further comprising instructions for:
    (d) determining that the disk array has failed, if the copy of the RAID driver is not found on any disk in the disk array.

14. The medium of claim 12, further comprising instructions for:
    (d) implementing the RAID; and
    (e) booting the operating system.

15. A system, comprising:
    a first disk in a RAID, wherein the first disk comprises a first boot partition, wherein the first boot partition comprises a first copy of a RAID driver; and
    a second disk in the RAID, wherein the second disk comprises a second boot partition, wherein the second boot partition comprises a second copy of the RAID driver.

16. The system of claim 15, wherein the RAID comprises an operating system, wherein a booting of the operating system comprises:
    (a) searching for the first copy of the RAID driver on the first boot partition;
    (b) searching for the second copy of the RAID driver on the second boot partition, if the first copy of the RAID driver is not found; and
    (c) loading the RAID driver, if the RAID driver is found.

* * * * *